United States Patent [19]
Hillestad

[11] Patent Number: 5,356,248
[45] Date of Patent: Oct. 18, 1994

[54] BOILER TUBE BANK REPAIR

[76] Inventor: Mark W. Hillestad, 220 Hatch Rd., Wadsworth, Ohio 44281

[21] Appl. No.: 154,751

[22] Filed: Nov. 17, 1993

[51] Int. Cl.$^5$ .............................................. B23B 35/00
[52] U.S. Cl. .................. 409/132; 408/1 R; 408/80; 409/180
[58] Field of Search .............. 29/890.043, 33 T; 409/132, 185; 408/82, 188, 201, 203.5, 1 R, 80, 81, 118

[56] References Cited

U.S. PATENT DOCUMENTS

| | | | |
|---|---|---|---|
| 3,759,625 | 9/1973 | Iversen | 408/188 |
| 3,999,452 | 12/1976 | Larsen | 408/188 X |
| 4,498,820 | 2/1985 | Brennan | 409/179 |
| 4,633,555 | 1/1987 | Legge | 29/157.4 |
| 4,761,104 | 8/1988 | Hillestad | 408/82 X |
| 5,007,778 | 4/1991 | Hillestad et al. | 408/201 X |
| 5,033,347 | 7/1991 | Hillestad et al. | 29/890.031 X |
| 5,044,075 | 9/1991 | Brennan et al. | 29/33 T X |
| 5,171,111 | 12/1992 | Kishimoto | 408/201 X |

FOREIGN PATENT DOCUMENTS
261871 7/1970 U.S.S.R. .............................. 408/188

*Primary Examiner*—Z. R. Bilinsky
*Attorney, Agent, or Firm*—Hudak & Shunk Co.

[57] ABSTRACT

A method for repairing boiler tube walls by cutting out and replacing a worn or damaged section thereof involves the use of a power tool having a rotary milling head specially adapted to remove membrane material from between tube ends which are exposed when the damaged section is removed. The method and apparatus of the invention allows for the rapid and precise removal of membrane material from between the exposed tube ends to facilitate subsequent bevelling and welding operations, while substantially reducing the risk of weakening or damaging the tube wall by avoiding excess removal of material therefrom.

7 Claims, 4 Drawing Sheets

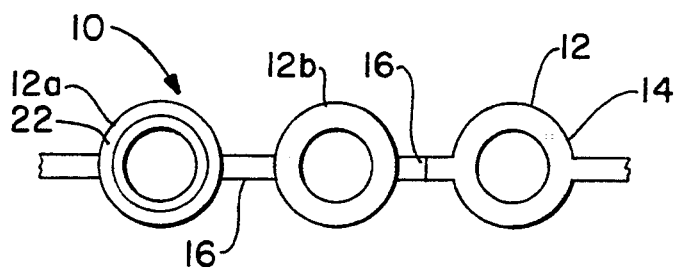
FIG.-1
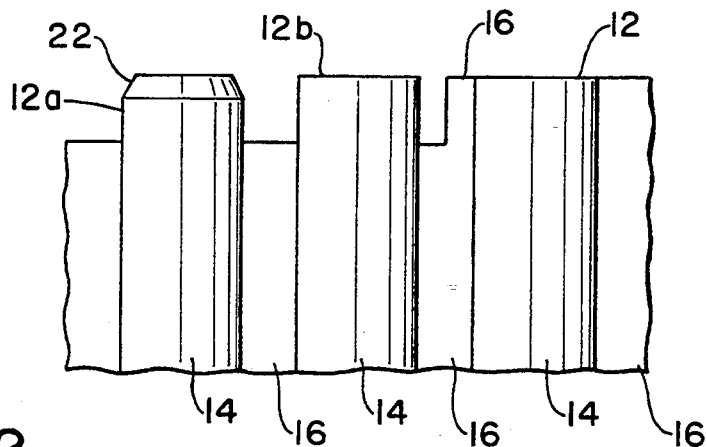
FIG.-2
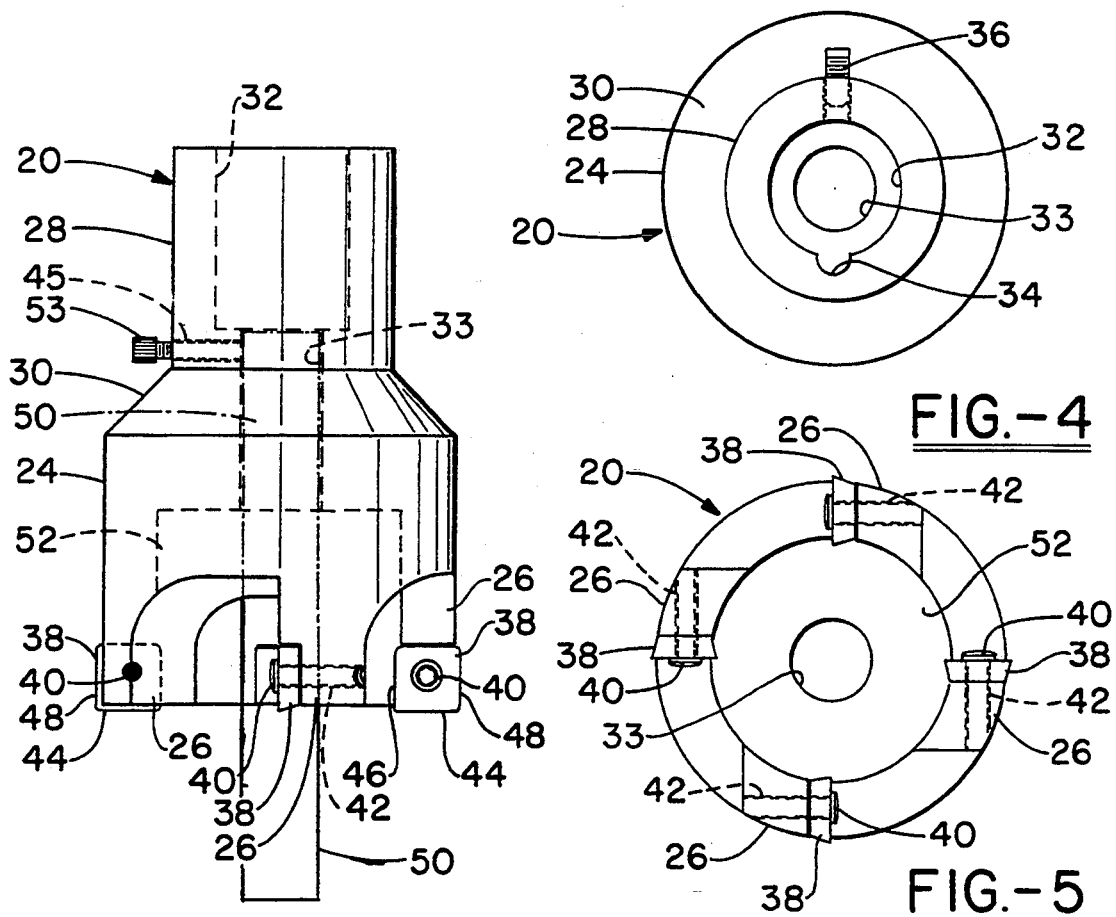
FIG.-3
FIG.-4
FIG.-5

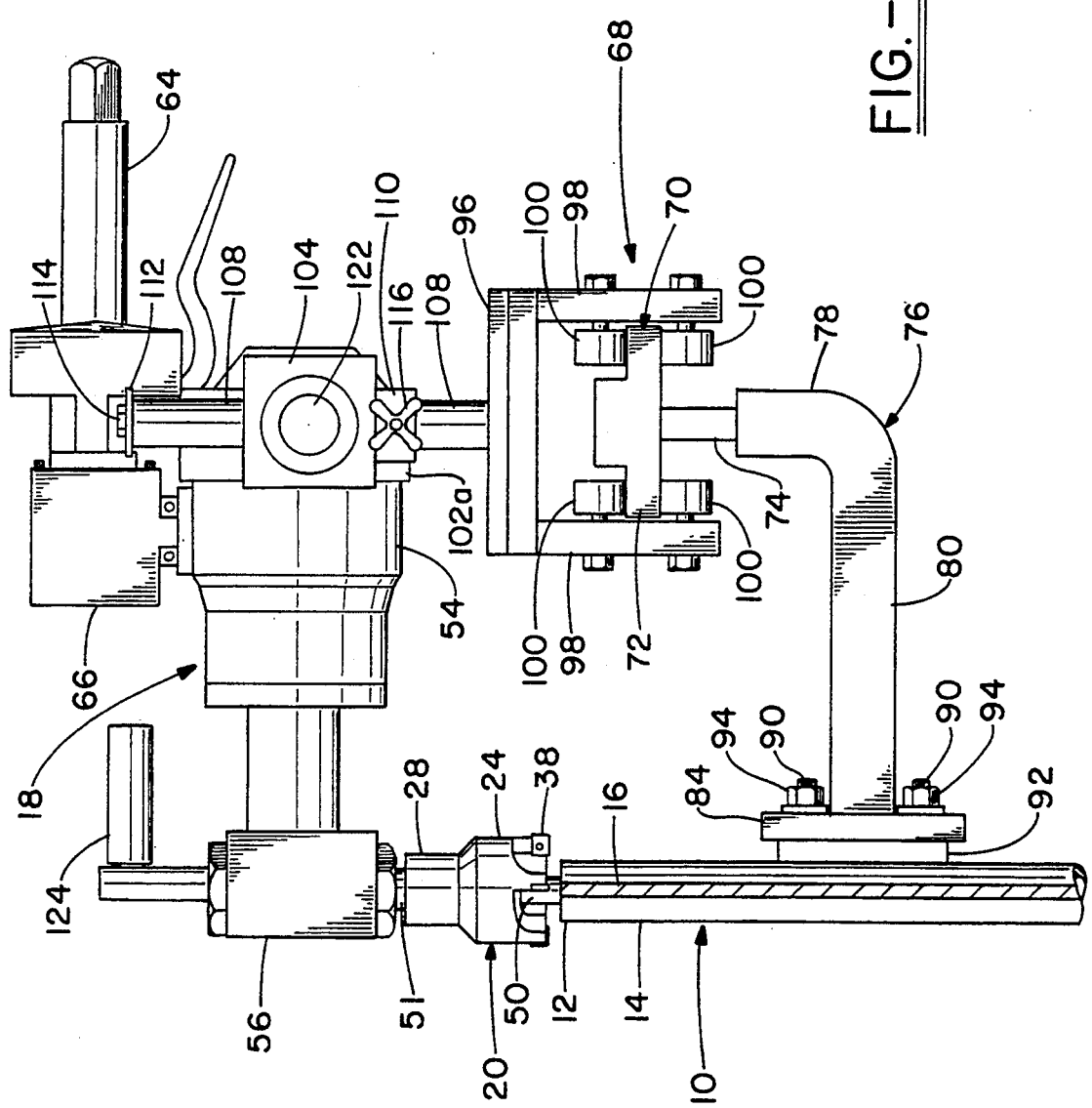

BOILER TUBE BANK REPAIR

TECHNICAL FIELD

This invention relates to the repair of boiler tube banks, and more specifically to a method and apparatus for removing the webbing or membrane material interposed between adjacent tubes of a continuous bank of boiler tubes to facilitate preparation of the tube ends for welding.

BACKGROUND OF THE INVENTION

Steam-generating boilers, such as those typically used at electrical power generating plants, are generally large steel or masonry structures containing hundreds of vertically arranged steel tubes which are in thermal contact with a burning fuel, such as coal. The burning fuel heats water circulated through the tubes. The heated water or steam is used to drive turbines which generate electricity.

The tubes are generally organized in large panels or banks of parallel tubes which are connected together with a metal membrane or web continuously interposed between each pair of adjacent tubes in the bank to form a tube wall. The tubes generally have an outer diameter which can range from about 1 inch up to about 3 inches, with a wall thickness which can range up to about 0.5 inch. The web or membrane connecting adjacent tubes to each other generally has a thickness about equal to the wall thickness of the tubes, with the width of the webbing generally ranging from about 0.25 inch to about 0.75 inch. The webs or membranes can be welded to the outer walls of adjacent tubes to form the tube banks; however, the tube and connecting membranes can be, and preferably are, formed together in a single casting operation.

On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sides ranging from a few feet to over 10 or even 20 feet in length.

The sections of tube banks which are to be replaced are generally cut out using a power saw or a cutting torch. A preferred method and apparatus for cutting out a section of boiler tube wall is illustrated and described in U.S. Pat. No. 5,033,347.

After the damaged or worn section of tube wall which is to be replaced has been cut out and removed, it is first necessary to properly prepare the tube ends exposed by removal of the old section before positioning the new tube bank section in the tube wall opening. Proper preparation of the exposed tube ends of the existing boiler tube wall requires chamfering or bevelling of the exposed tube ends to facilitate a good weld between the new tube wall section and the existing boiler tube wall. More specifically, the adjoining tube ends of the existing tube wall and those of the new or replacement section of tube wall should be provided with a frustoconical bevel so that when the adjoining tube ends are placed in alignment, a circumferential groove is formed to receive molten metal from the welding rod. The replacement section of tube wall is usually fabricated and prepared for welding off-site before the damaged or worn section of existing tube wall is removed. The exposed tube ends of the existing tube wall, however, must be prepared for welding on-site, often in a confined space. It is highly desirable that all work performed on the existing tube wall be conducted as quickly and efficiently as possible so as to minimize the period during which the steam generator is taken out of service for repair. Accordingly, preparation of the exposed tube ends of the existing tube wall for welding is generally accomplished using high-speed, portable, hand-held milling tools such as those disclosed in U.S. Pat. Nos. 4,449,871 and 4,889,454.

To facilitate rapid and efficient chamfering or bevelling of the exposed tube ends of the existing tube wall using conventional high-speed milling tools, and to provide ample space between vertically adjacent tubes for welding around the entire circumference of the tube ends, it is highly desirable and generally necessary to remove a portion of the membrane between each pair of exposed tube ends of the existing tube wall. Typically, it is desirable to remove the membrane, between adjacent tube ends which are exposed by removal of the damaged wall section, from the horizontally cut edge of the existing boiler tube wall to a depth which is at least equal to the depth of the frusto-conical bevel which is to be milled at the tube end. Typically, membrane material is removed from the horizontally cut edge between two adjacent tubes to a depth of from about ⅜ inch to about ¾ inch from the cut edge. Heretofore, removal of the membrane material from the area between adjacent tube ends of the existing tube wall has been achieved using a cutting torch or portable power tools such as a grinding tool having a rotating abrasive disk or with a circular saw. None of the conventional methods of removing the membrane material from between tube ends is entirely satisfactory. Cutting torches are much faster and less prone to failure and damage than power tools, such as saws and rotating abrasive disks, but expose the tube walls to extremely high temperatures which can weaken or damage the tubes. The presently preferred method of removing membrane material from between the tubes is to make two vertical cuts, generally at the junctures between each of the two adjacent tubes and the intervening membrane, to form a tab which is folded or bent away from the area of the tube ends. When making the two vertical cuts along each side of the membrane, care must be taken to avoid removal of material which would reduce the nominal or effective thickness of the tube wall. After the pair of cuts have been made in the membrane, and the material between the cuts has been bent away from the tube ends, it is then generally necessary to grind the excess material from the tube to provide a uniform wall thickness around the circumference of the tube ends which are to be bevelled. These techniques are very time-consuming, generally requiring several minutes for each pair of tubes.

SUMMARY OF THE INVENTION

The invention provides a method and apparatus for rapidly and precisely removing membrane material from between adjacent tube ends of a tube wall to facilitate milling of a frusto-conical bevel on the tube ends and to provide sufficient space to facilitate welding around the entire circumference of the tube end, while substantially eliminating any possibility of damaging the tube wall.

The method generally involves the usual step of cutting a worn or damaged section from an existing boiler tube wall to provide an opening in the tube wall having upper and lower horizontal edges transverse to the longitudinal direction of the vertical tubes comprising the tube wall. In accordance with the principles of the invention, the membrane material between adjacent tubes of the boiler tube wall is removed in the immediate vicinity of the exposed tube ends along the horizontal edges cut into the boiler tube wall by means of a power tool having a rotary milling head which is specially adapted for this purpose. The milling head includes a pilot tube adapted to be inserted into an exposed tube end of an existing boiler tube wall from which a worn or damaged section has been removed. The pilot tube positions and stabilizes the milling head to prevent movement or jerking of the tool in a direction lateral to the longitudinal direction of the tubes during the milling operation. The milling head includes a plurality of angularly disposed cutting blades, each of which has a cutting edge radially displaced from the axis of rotation of the milling head to define an annular cutting sweep having an inner radius which is about equal to the nominal outer radius of a tube of the tube wall. The radial thickness of the cutting sweep is typically from about ⅜ inch to ½ inch to allow sufficient clearance for subsequent bevelling and welding around the tube ends. The cutting Sweep of the blades thereby provides for adequate removal of membrane material from between pairs of adjacent tubes of the tube wall in the vicinity of the tube ends without any risk of damage to, or milling of, the nominal tube wall.

An annular recess radially disposed between the pilot tube and the cutting sweep of the radially disposed blades accommodates and receives a tube end of the tube wall during the milling operation. The depth of the recess is at least equal to the depth of the frustoconical bevel which is to be milled at each of the tube ends. During the milling operation, after the pilot tube is inserted into one of the tube ends and after the drive means for the power tool is actuated, the tool and attached milling head are urged toward the tube end to gradually mill a desired amount of membrane material from the area immediately adjacent the tube end. The membrane milling operation is then repeated for each of the exposed tube ends to facilitate bevelling of the tube ends and to provide ample space between adjacent tubes for welding a new tube bank section to the existing tube wall.

BRIEF DESCRIPTION OF THE DRAWINGS

FIG. 1 is a top plan view of a tube wall showing tube ends which have been exposed by removal of a section of the tube wall;

FIG. 2 is a front elevational view of the tube wall of FIG. 1;

FIG. 3 is a side view of the milling head of the invention;

FIG. 4 is a top view of the milling head shown in FIG. 3;

FIG. 5 is a bottom view of the milling head shown in FIG. 3;

FIG. 8 is a side elevational view of the track mounted tool shown in FIG. 7.

DETAILED DESCRIPTION OF THE INVENTION

Figure 6:
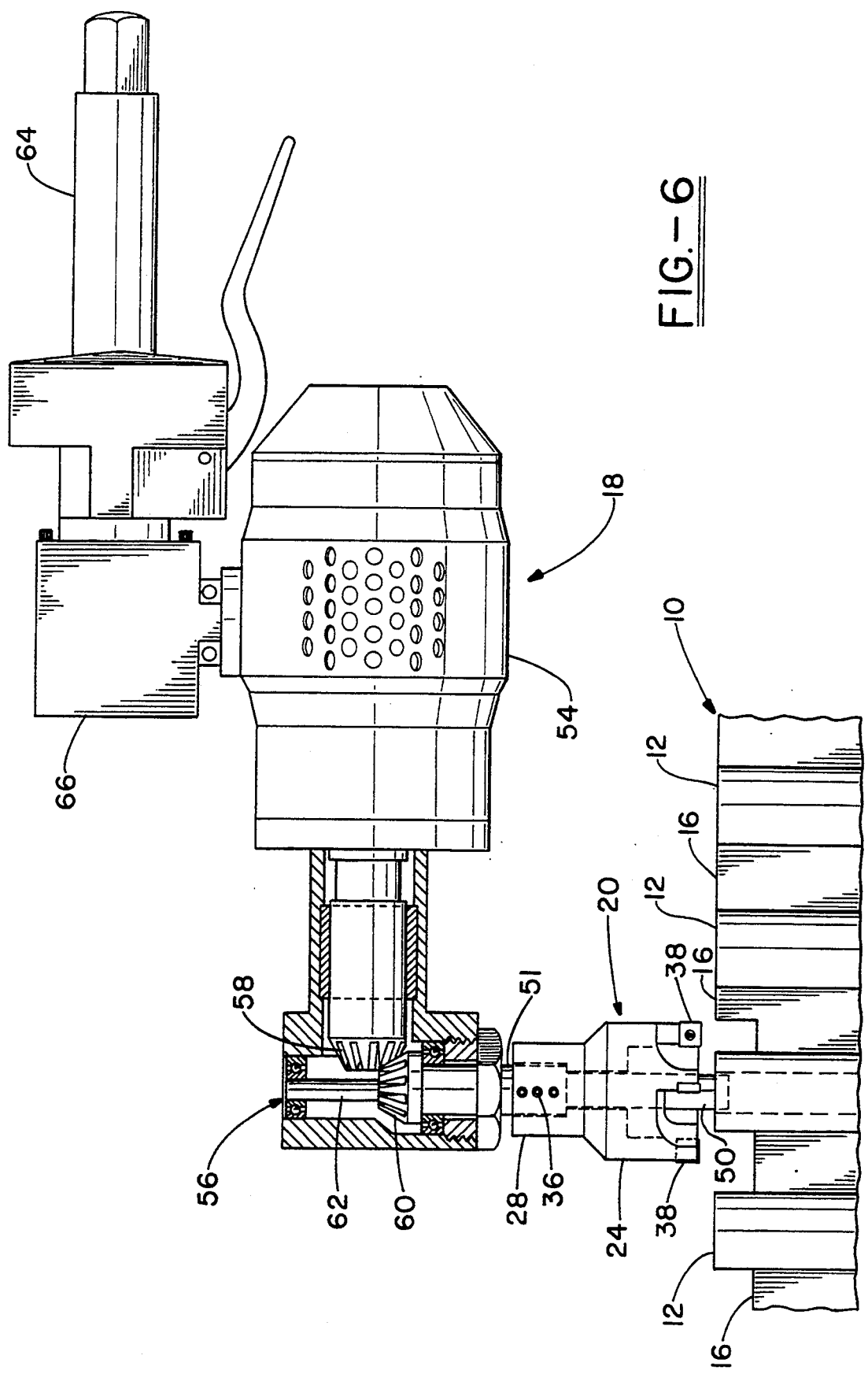
FIG. 6 is a side view of a tool incorporating the milling head shown in FIGS. 3-4.

There is shown in FIGS. 1 and 2 a portion of a boiler tube wall 10 from which a section has been cut out to expose tube ends 12. The boiler tube wall 10 is comprised of a row of parallel, vertically oriented tubes 14, each of which is continuously connected to an adjacent tube by a web or membrane 16. The tubes 14 and membranes 16 are generally made of steel, and can]be formed together as by casting or formed separately and then welded together. Repair of boiler tube walls generally involves cutting out a section of the tube wall which is worn or damaged, chamfering or bevelling the tube ends which have been exposed by removal of the worn or damaged section of tube wall, and welding a new or replacement section of tube wall in place of the damaged section which has been removed. The damaged section of tube wall is usually removed by making two horizontally spaced cuts transverse to the longitudinal direction of the tubes 14 and two vertically spaced cuts, which together with the horizontal cuts define a rectangular section which is to be replaced. Before a new or replacement section of the wall can be installed, it is necessary to prepare the tube ends for welding by first removing membrane material from between the tube ends and then bevelling the tube ends.

In accordance with the principles of the invention, a power tool 18 (FIG. 6) having a rotary milling head 20 is used to remove membrane material from between the tubes in the area generally in proximity with the tube ends. FIG. 2 shows a portion of a tube wall, wherein membrane material has been removed from the area between the exposed tube ends of tubes 12a and 12b in preparation for a subsequent bevelling operation. Tube 12a is shown with a bevelled end 22, suitable for welding a similarly prepared tube end thereto.

The rotary milling head 20 (FIGS. 3, 4 and 5) has a generally cylindrical body 24 with a plurality of axially extending radial cutting blade supports 26 at one end and a reduced diameter coaxial cylindrically shaped tool mounting portion 28 at the other end, with an intervening frusto-conical section 30 connecting the body 24 with the mounting portion 28. The mounting portion has a coaxial cylindrical bore 32 for removably receiving an arbor 51 (FIG. 6) of the power tool by way of a key slot 34. The cylindrical bore 32 includes a key slot 34 which matingly engages a key on the arbor 51 to lock the rotary milling head 20 to the arbor 51. The mounting portion 28 of the rotary milling head 20 is provided with a plurality of radial threaded bores which receive hexagonal head set screws 36 which are used to removably secure the milling head to the power tool 18. Of course, various other means for mounting the milling head 20 to an output shaft of a rotary tool are possible, such as a threaded bore on the milling head mounting portion for screwing the milling head to a threaded output shaft of a rotary tool, or any of various conventional tool chucks or other means for mounting a tool piece to the output shaft of a rotary power tool.

A cutting blade 38 is removably secured to each of the cutting blade supports 26 by means of a hexagonal head screw 40 received in a threaded bore 42 provided in each of the cutting blade supports 26. The cutting blades 38 are preferably generally square-shaped and have at least three cutting edges 44, 46 and 48, one of which 44 is perpendicular to the rotational axis of the milling head 20, the other two cutting edges 46, 48 being parallel to the rotational axis of the milling head with the space therebetween being coextensive with the length of the cutting edge 46 and defining the cutting sweep of the blades 38.

More preferably, the square cutting blade 38 can be provided with four cutting edges, 44, 46, and 48, plus a fourth cutting edge opposite cutting edge 44. This allows for extended use of the blade 38. For example, if one of the edges becomes chipped, it would be possible to loosen the screw 40, rotate the blade 38 so that the damaged edge is facing the blade support and is no longer used as a cutting edge, and then retighten screw 40.

In accordance with the preferred embodiments of the invention, cutting edges 44, 46, and 48 preferably have a positive rake to provide for the best possible cutting speed. However, blades having a neutral rake or a negative rake can also be used and have certain other advantages. For example, negative rake blades wear better, but require a longer cutting time. Blades having neutral rake cutting edges (i.e., flat cutting edges) wear and cut at a rate intermediate between blades having positive and negative rake cutting edges. Neutral rake blades have the additional advantage of being reversible, i.e., the blade can be rotated about an axis normal to the cutting edge thereby providing for extended use.

Other blade shapes, such as triangular-shaped blades, can be used but are less desirable. Likewise, it is not necessary that one of the cutting edges of each of the blades be perpendicular to the rotational axis of the milling head 20. However, square blades arranged with one of the cutting edges 44 being perpendicular to the rotational axis of the milling head are highly preferred because they provide the greatest cutting efficiency and lowest potential for damage and wear of the blades. It has been generally found that more blades provide for better cutting efficiency and reduced blade damage and wear. However, it becomes increasingly difficult to machine milling heads with more than four blade supports and to change blades when there are more than four blade supports. Accordingly, the milling head 20 preferably has four blade supports 26 which are angularly disposed in a symmetrical fashion. The cutting blades 38 can be made of any suitably hard material, such as tungsten carbide, customarily used for cutting or milling steel and other metals or alloys.

A pilot rod 50 extending outward from the cutting end of the cylindrical body is provided to guide and stabilize the power tool 18 during the milling operation. The pilot rod 50, which is inserted into a tube end opening before and during the milling operation, is cylindrical and is aligned coaxially with the rotational axis of the milling head 20. The diameter of the pilot rod is only slightly smaller (such as about 0.005 inch) than the inner diameter of the tube wall to prevent jerking of the tool during the milling operation and to ensure accurate milling of the membrane, thereby preventing removal of material from the nominal tube wall. The pilot rod 50 is preferably removably secured within bore 33 of milling head 20 such as by a set screw 53 received in a threaded bore 45, or by providing threads at one end of pilot rod 50 which mate with threads of bore 33. However, as an alternative, pilot rod 50 can be an extension of arbor 51 with the pilot rod 50 passing through bore 33 but not attached thereto. An annular recess 52, generally positioned between the cutting blade supports 26 and the pilot rod 50, is provided at the cutting end of the milling head 20 to further stabilize and guide the tool 18 during the milling operation. The outer circumferential wall of the recess 52 has a diameter which is generally only slightly larger (such as about 0.005 inch) than the outer diameter of the nominal tube wall. During the milling operation, as membrane material 16 adjacent a tube end is being removed, the milling head 20 is advanced toward the tube end 12 such that the tube end is received within the recess 52. The depth of the recess is sufficient to allow for removal of enough membrane material to facilitate bevelling and welding of the tube ends to a replacement tube bank.

The milling head can generally be used with any of various power tools having a high-speed rotating shaft. The tool motor can be electrically, hydraulically, or pneumatically driven, with air-driven motors being generally preferred. It has been found that high-speed rotation of the milling head, such as from about 3000 to about 12,000 RPM and more preferably from about 3000 to about 6000 RPM, is highly desirable to achieve efficient cutting and reduced wear and damage to the blades and milling head. A preferred rotary power tool 18 suitable for use with the invention is fully described in U.S. Pat. No. 5,007,778, which is hereby fully incorporated by reference herein. The rotary power tool 18 generally includes a housing 54 which contains a motor assembly capable of operating at speeds of about 3500 RPM with 90 psig air. The tool includes a right angle-drive output head 56 with a head gear 58 which meshes with right angle-bevel gear 60 journalled to shaft 62. A handle assembly 64 is actually connected to an adapter 66 which has one side thereof connected to the housing 54 to achieve a minimal space profile of the tool assembly 54.

In operation, the tool is positioned such that the pilot rod 50 is in alignment with a tube 12 from which membrane material 16 is to be removed from either side thereof. The tool pilot rod 50 is inserted into the tube, bore with the blades resting on the edge of the membrane walls. The motor is then actuated initiating high-speed rotation of the milling head 20. The milling head is then gradually advanced toward the tube end 12 until the desired amount of membrane has been removed.

The milling or removal of membrane material to a typical depth of about $\frac{1}{2}$ to 1 inch from the cut edge of the tube wall is achieved in about 10 to about 20 seconds in accordance with the methods and apparatus of the invention as opposed to several minutes for conventional techniques.

Figure 7:
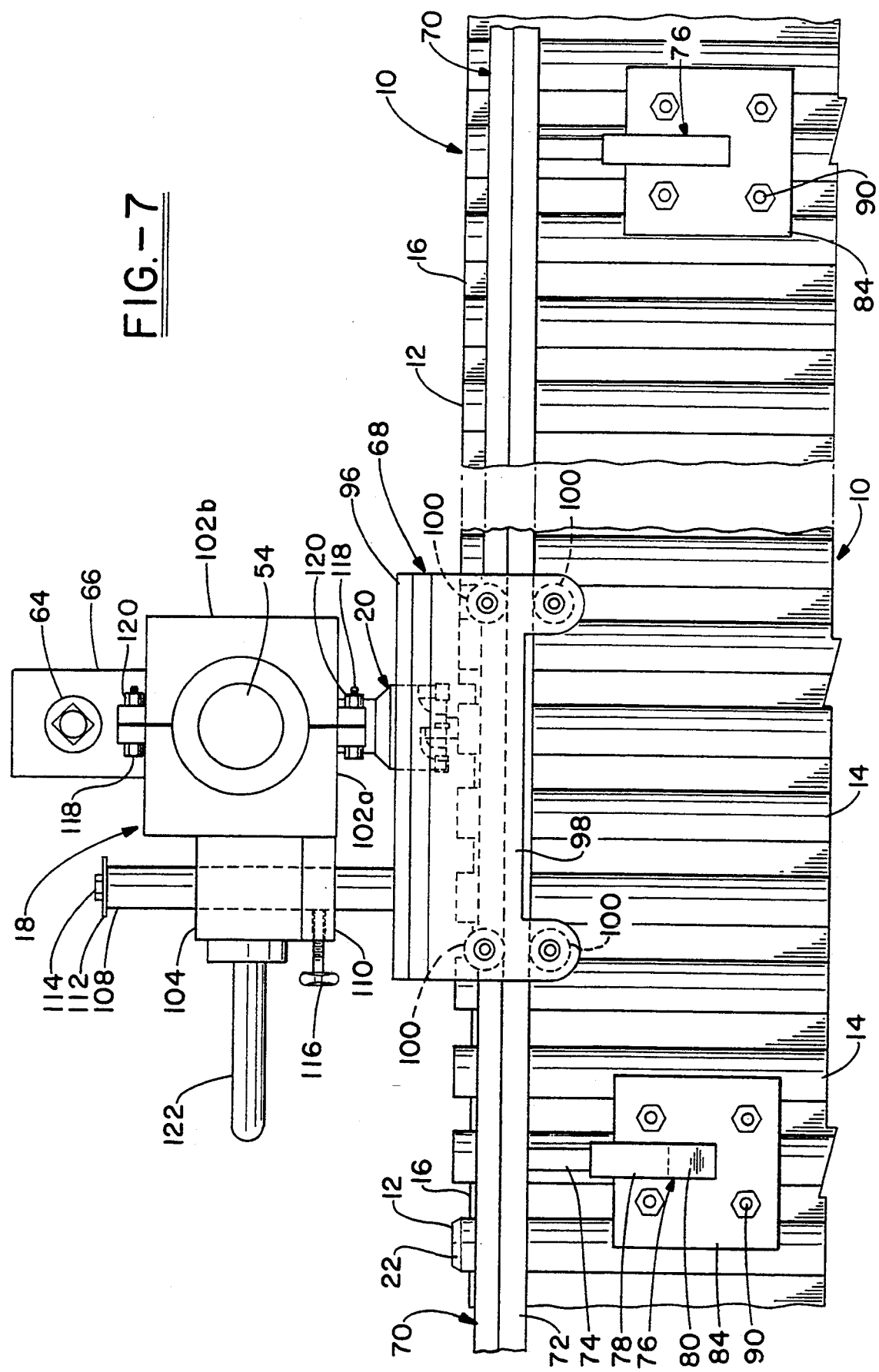
FIG. 7 is a front elevational view of a track mounted version of the tool shown in FIG. 6.

The milling apparatus and method of the invention can be used either with hand-held tools, as shown in FIG. 6, or with track-mounted tools, as shown in FIGS. 7 and 8.

The power tool 18 of the track mounted apparatus is generally similar to that shown in FIG. 6. The tool 18 is suitably mounted to a carriage 68 to allow for vertical movement of the tool relative to the carriage along a line parallel with the axial direction of the tubes of a boiler tube bank, and for rotational movement of the tool relative to the carriage in a horizontal plane perpendicular to the axial direction of the tubes in the tube bank. The carriage 68 is designed for linear motion along a horizontally arranged track member 70 suitably secured to the tube bank 10. A suitable track and carriage means which is adaptable for use with the invention is shown and described in U.S. Pat. No. 5,033,347, hereby fully incorporated by reference herein. The track member 70 has a T-shaped transverse cross-section comprising a horizontal track flange 72 and an underlying vertically arranged support flange 74. The track member 70 is supported by laterally spaced heavy-duty brackets 76 having an upright arm 78 for supporting the track member 70 and a longitudinal arm 80 adapted to be secured to the tube bank 10. The track member 70 can be secured to the brackets 76 by any suitable means such as by providing upright arm 78 with a deep vertical recess adapted to receive and securely hold depending vertical support flange 74 of T-shaped track member 70. The longitudinal arm 80 is welded or otherwise secured to a vertical adjustment plate 84. Each vertical adjustment plate 84 preferably includes upper and lower adjustment slots comprising a vertical elongated slot adapted to receive a heavy-duty adjustment bolt 90 welded to a backplate 92. The backplate 92, in turn, is welded or otherwise secured to laterally spaced pairs of boiler tubes or to other supporting structure located adjacently to the bank of boiler tubes 10. The adjustment plates 84 can be adjusted vertically relative to adjustment bolts 90 extending through upper and lower slots of the adjacent plates, whereupon adjustment plate 84 can be locked to backplate 92 by tightening a lock nut 94 on each adjustment bolt 90. The carriage 68 includes a base 96 and a pair of depending side members which are laterally disposed adjacent opposite sides of track flange 72. At each of the four corners of the carriage 68 there is provided a pair of vertically spaced wheels 100 which engage the upper and lower edges of track flange 72 to allow for movement of the carriage 68 relative to the track member 70. The tool 18 is secured to the carriage 68 by means of a two-part clamp 102a, 102b, which is fixedly secured to a bearing member 104 having a cylindrical bore 106 through which passes a vertical support rod 108 fixedly secured to the base 96 of carriage 68. The tool 18 can be raised or lowered by moving the bearing member relative to the vertical support rod 108. Vertical movement of the tool is limited by adjustable lower stop 110 and by upper stop 112 removably secured to the top of vertical support rod 108 by means of bolt 114. The adjustable lower stop 110 comprises a ring or collar through which the vertical support rod 108 passes and includes a radially disposed threaded bore for receiving a threaded locking means 116 having a knob. The position of the adjustable lower stop 110 on the vertical support rod 108 is set so that when the bottom of bearing member 104 rests on the top of adjustable lower stop 110, the milling head 20 achieves the desired amount of membrane removal when the milling head is properly aligned with a tube end. Positioning of the adjustable lower stop 110 is accomplished by rotating the knob of locking means 116 to disengage the same from the vertical support rod 108, then sliding adjustable lower stop 110 to the desired position and rotating the knob of locking means 116 in the opposite direction so that the end of the locking means engages support rod 108. The two-part clamp 102a and 102b is designed to grip tool 18 about the circumference of motor 54. The clamp is closed and the tool is firmly held in place by tightening bolts 118 relative to nuts 120. In addition to handle 64, in order to facilitate movement of the apparatus from one tube to the next tube, a handle 122 is secured to bearing member 104 and a handle 124 is secured to the top of right angle drive output head 56. The track mounted apparatus reduces muscle fatigue by limiting strenuous lifting to movement of the tool and milling head from one tube to the next tube. The track mounted apparatus is particularly convenient in those situations where a track has already been installed for a boiler tube cutting apparatus such as disclosed in U.S. Pat. No. 5,033,347. While a track mounting system has been described in terms of a relatively simple arrangement wherein the tool is lifted and moved from one tube to another by means of handles 122 and 124, other means for raising and lowering the tool can be provided. For instance, vertical support rod 108 can be replaced with a vertical rack which intermeshes with a pinion structurally supported in fixed relationship relative to clamp 102a and operatively connected to a rotatable lever (not shown).

While in accordance with the patent statutes a preferred embodiment and best mode has been presented, the scope of the invention is not limited thereto, but rather is measured by the scope of the attached claims.

What is claimed is:

1. A method for removing membrane material from the area between exposed tube ends of a boiler tube wall from which a section thereof has been cut out for replacement with a new section, to facilitate milling of a frusto-conical bevel on an exposed tube end of said boiler tube wall and subsequent welding of said new section thereto, said method comprising: simultaneously removing membrane material from the areas immediately adjacent opposite sides of an exposed tube end using a motor-driven tool having a rotary milling head.

2. The method of claim 1, wherein said rotary milling head includes a plurality of cutting blades at the milling end thereof, said cutting blades being angularly disposed relative to the rotational axis of said milling head and defining an annular cutting sweep having an inner radius which is about equal to the nominal outer radius of a tube of said boiler tube wall.

3. The method of claim 2, wherein said rotary milling head further includes a pilot rod adapted to be inserted into a tube end of said boiler tube wall to position and stabilize said milling head during the milling operation, and an annular recess radially disposed between said pilot tube and said angularly disposed cutting blades, said recess having a depth sufficient to allow removal of said membrane material between adjacent tube ends from a cut edge of the boiler tube wall to a depth at least equal to the depth of the frusto-conical bevel which is to be milled at a tube end.

4. The method of claim 1, wherein the motor of said tool is capable of rotating said milling head at from about 3,000 to 12,000 RPM during the milling operation.

5. The method of claim 3, wherein the motor is pneumatic-powered and is capable of achieving a rotational speed of at least about 3,000 RPM with 90 psig air.

6. The method of claim 2, wherein each of said blades is substantially square-shaped an has at least three cutting edges, one of which is substantially perpendicular to the rotational axis of the milling head, the other two of which are substantially parallel to the rotational axis.

7. The method of claim 2, wherein the milling head has four symmetrically disposed cutting blades.

* * * * *